Patented Dec. 2, 1952

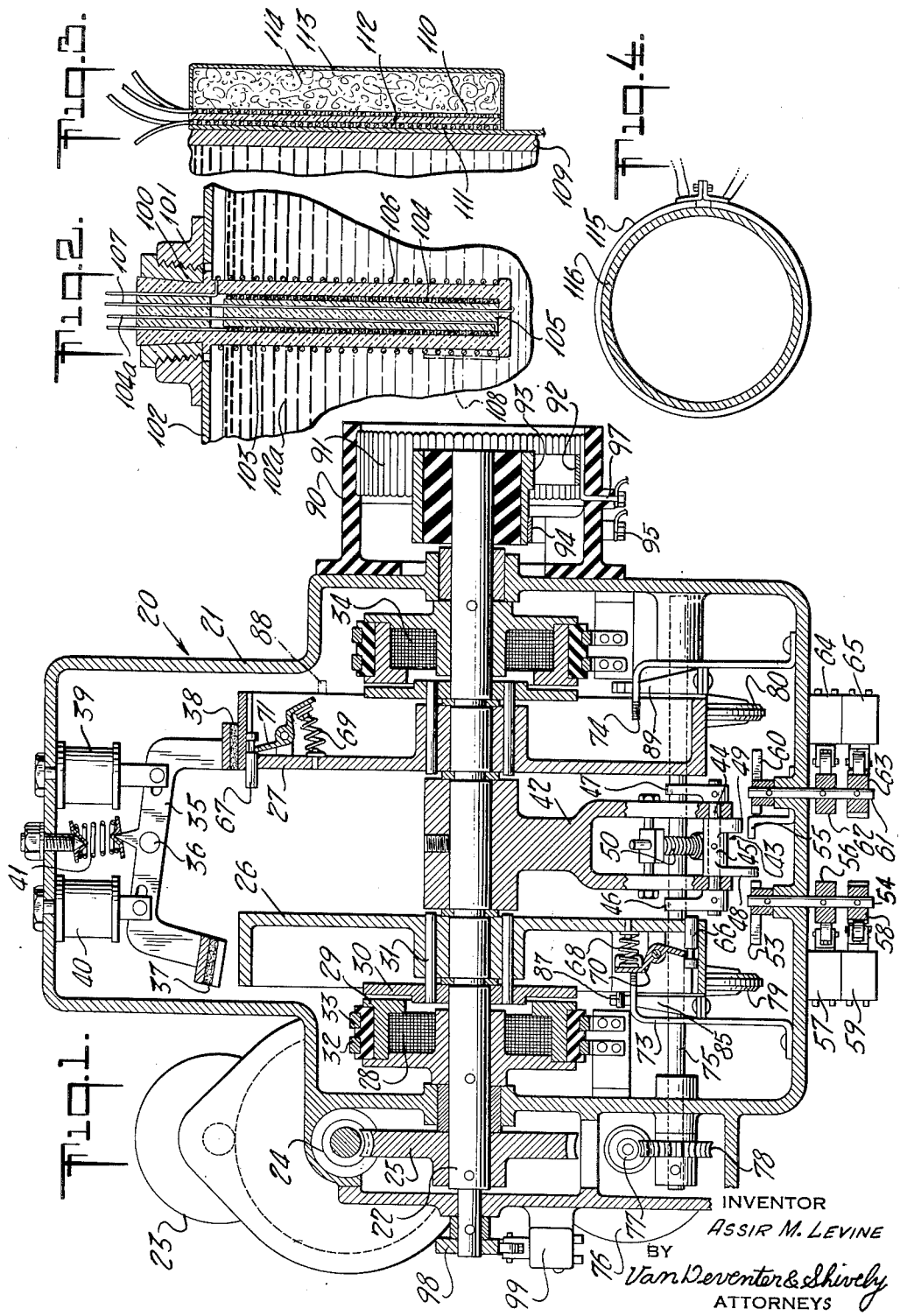

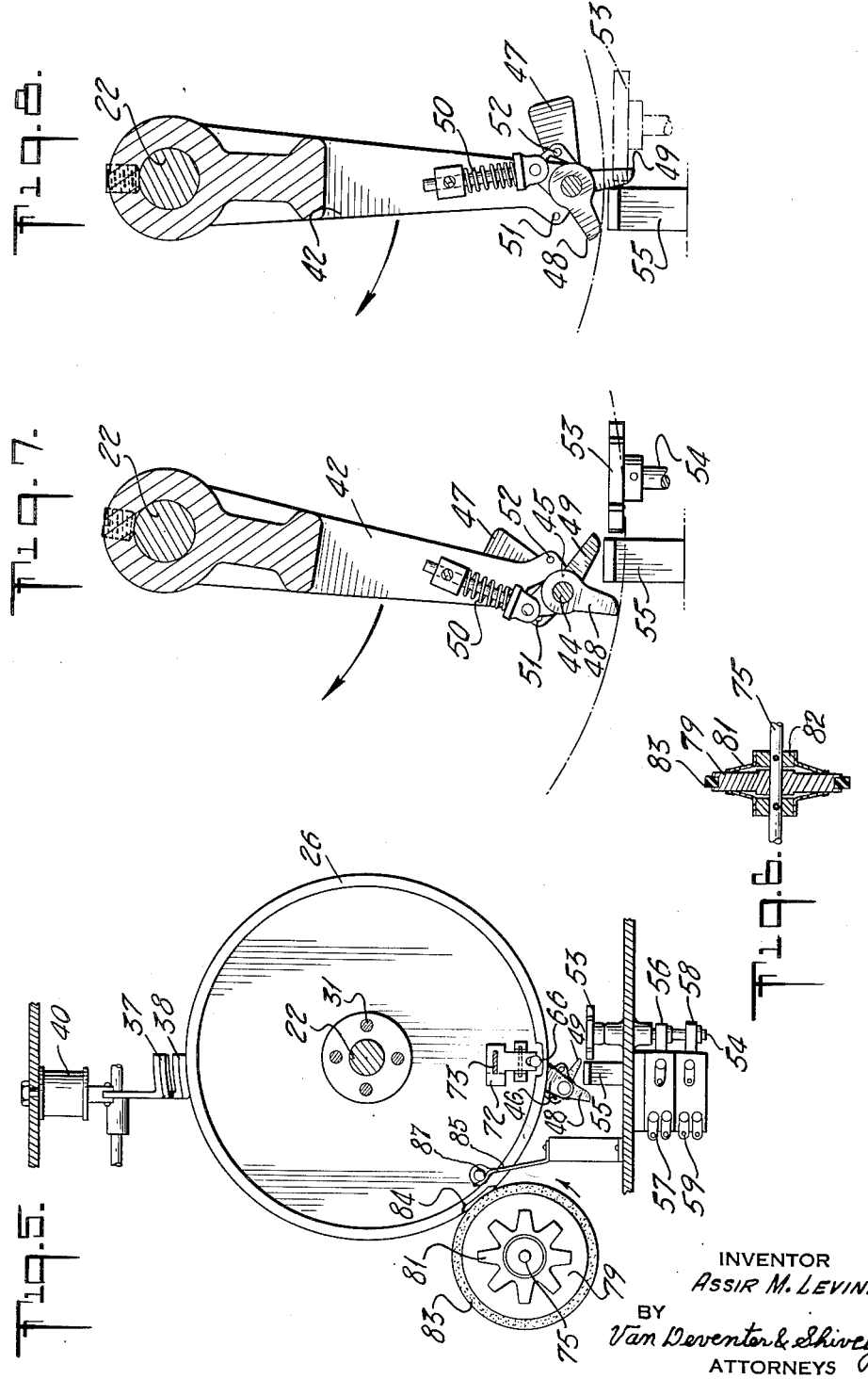

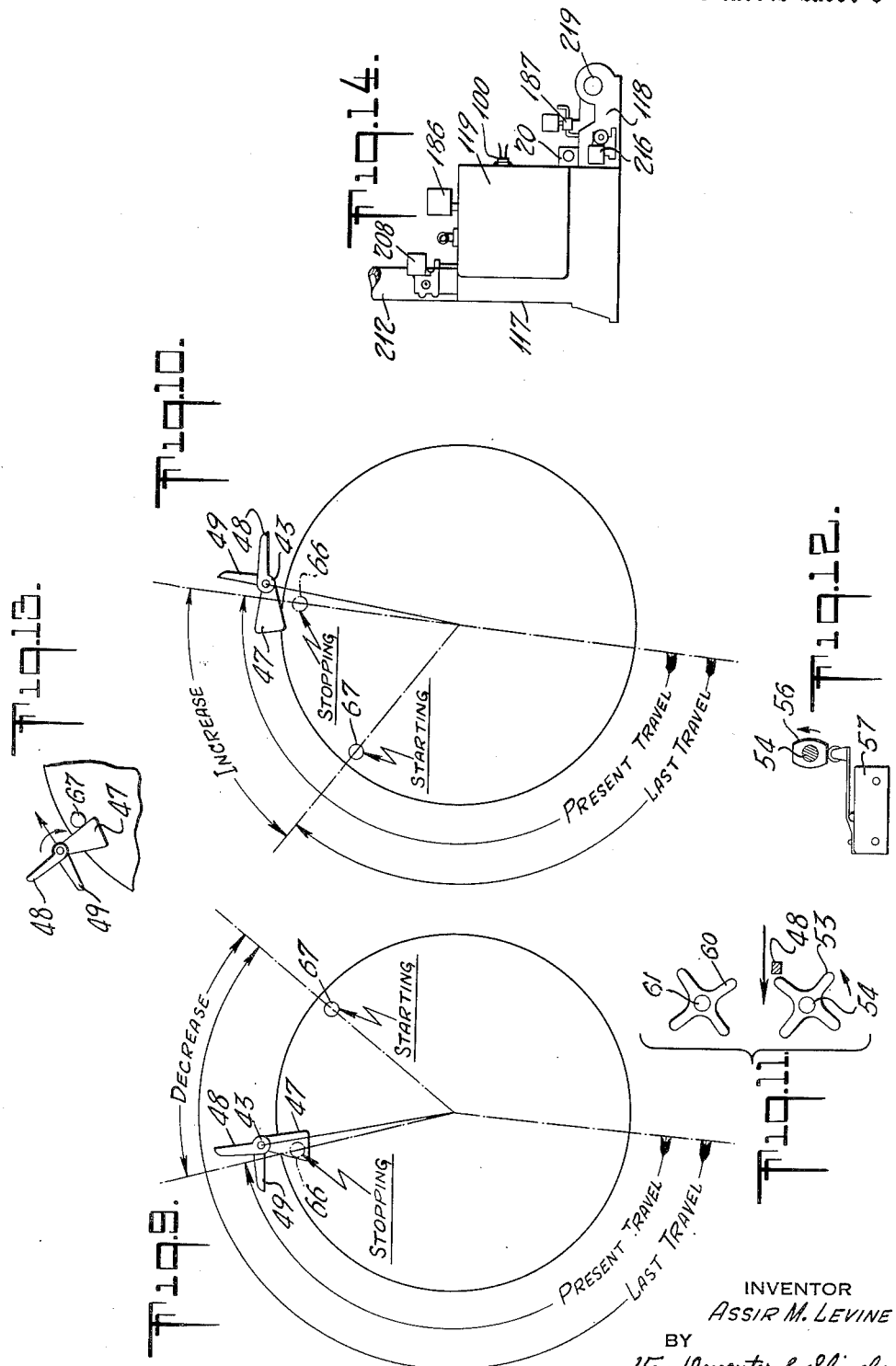

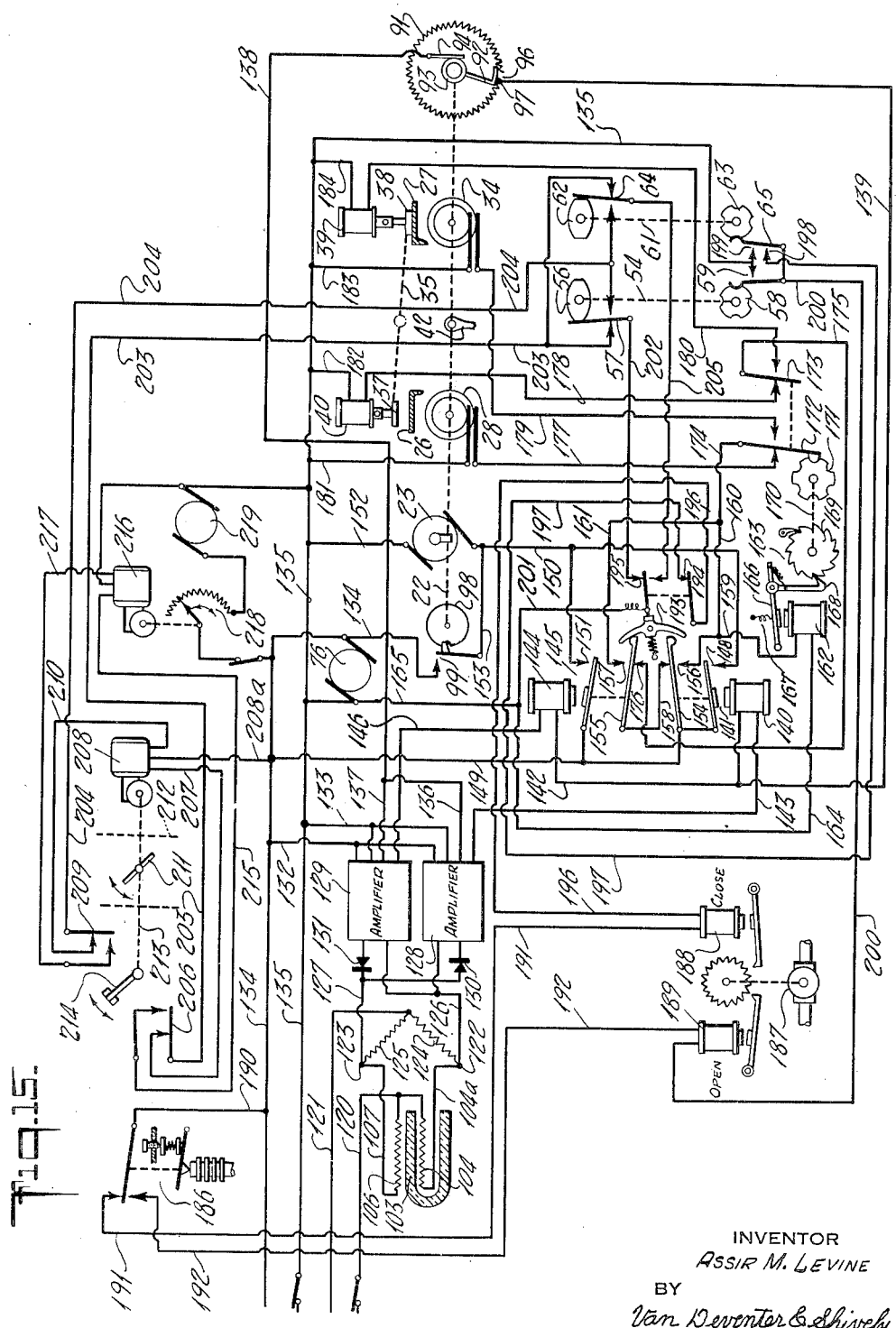

2,620,136

UNITED STATES PATENT OFFICE 2,620,136

APPARATUS FOR THE CONTROL OF HEATING

Assir M. Levine, New York, N. Y.

Application December 16, 1948, Serial No. 65,675

4 Claims. (Cl. 236—78)

The present invention pertains to improvements in apparatus for the control of heating. This application being a continuation in part of my co-pending application Serial No. 603,557, filed July 6, 1945, now abandoned.

An object of the invention is to provide an apparatus by which a heating process is controlled in direct response to variations in the rate of temperature change of the medium being heated.

A further object is to provide an apparatus of the above nature including the comparison of the rates of temperature change of the heated medium over successive time intervals and the regulation of the heat-furnishing means in response to the changes established by said comparisons.

A further object is to provide an apparatus of the above nature including the setting up of successive mechanical relationships representative of the rates of temperature change of a heated medium over successive time intervals, and the automatic regulation of the related combustion process and in response to changes in said successive mechanical relationships.

A further object is the provision of a regulating method of the above nature which is operable independently of the absolute temperature zone of the heating process.

A further object is to provide apparatus of the above type including a Wheatstone bridge combination having a resistor of one leg exposed directly to the temperature of the medium being heated and the corresponding resistor of the other leg exposed to the same temperature through a substance adapted to retard the flow of heat to said second resistor.

A still further object is to provide apparatus of the above nature including fuel and air regulating means jointly controllable in response to changes in the electrical unbalance of the Wheatstone bridge combination.

Other objects and advantages of the invention will become evident during the course of the following description in connection with the accompanying drawings, in which Fig. 1 is a longitudinal sectional view of a preferred form of the central control unit;

Fig. 2 is a longitudinal sectional view of an immersion form of detector unit;

Fig. 3 is a sectional view of an alternative form of detector unit;

Fig. 4 is an exterior view of a similar detector unit formed as a circular band;

Fig. 5 is a detail end view of one of the follower drums and related parts;

Fig. 6 is a detail sectional view of one of the frictional restoring wheels;

Fig. 7 is an enlarged partial sectional view of the shifter latch mechanism in normal stop position;

Fig. 8 is a similar view showing the mechanism approaching stop position;

Fig. 9 is a diagram illustrating the interaction of the shifter latch and follower detents during a decrease in the rate of temperature change;

Fig. 10 is a similar diagram illustrating the inter-action during an increase in rate of temperature change;

Fig. 11 is a detail plan view of the reverse switching star wheels;

Fig. 12 is a similar view of one of the reversing switches;

Fig. 13 is a fragmental detail illustration of the engagement of the shifter latch with a follower detent;

Fig. 14 is a simplified illustration of a heating plant suitable for control by the invention, and Fig. 15 is an electrical diagram illustrating the operation of a preferred form of the invention.

Referring to Fig. 1, the numeral 20 generally denotes a central control unit having a casing 21 in which is journalled a longitudinal shaft 22. A motor 23 is adapted to drive the shaft 22 at reduced speed via a worm 24 and worm gear 25.

A pair of follower drums 26 and 27 are rotatably mounted on the shaft 22 in axially spaced relation. A magnetic clutch 28 has its driving member 29 secured to the shaft 22 and its driven member 30 secured to pins 31 which are slidably mounted in the hub of the follower drum 26. It is evident that when the clutch 28 is energized via its slip rings 32 and 33, the drum 26 is clutched to the shaft 22 so as to be driven therewith. A similar clutch 34 is provided to drive the follower drum 27.

A rocker 35, pivoted at 36 in the casing 21, carries brake shoes 37 and 38. Two solenoids 39 and 40 are adapted to rock the shoes 37 and 38 alternately into engagement with the peripheries of the drums 26 and 27 respectively. A strong toggle spring 41 is provided to hold either brake shoe in engagement with its respective drum when the solenoids are de-energized.

A forked arm 42 is secured to the shaft 22 between the drums 26 and 27. The outer end of the arm 42 carries an assembly 43 hereinafter referred to as the shifter latch, comprising a pivotally mounted shaft 44 to which are secured a central hub 45 and two exterior segmental levers 46 and 47. The hub 45 has formed thereon a shifter finger 48 and a reset finger 49. The levers 46 and 47 normally extend substantially radially inward toward the main shaft 22. The angular relationship between the levers 46, 47 and the fingers 48, 49 is shown in Figs. 7 and 8. Thus in normal or reset position, Fig. 7, the shifter finger 48 extends radially outward, while the reset finger 49 extends substantially rearward from the direction of rotation. In the second or tripped position, Fig. 8, the levers 46 and 47 are swung rearwardly, the shifter finger 48 is swung forwardly, while the reset finger 49 extends radially outward. A toggle spring 50 is adapted to hold the shifter latch assembly in either of the above positions against stop pins 51 and 52 respectively.

A star-wheel 53, mounted on a vertical shaft 54, is disposed adjacent the path of rotation of the shifter latch 43 just rearwardly of the latter's stop or zero position, as shown in Fig. 7. If the latch 43 is in normal or reset position as it approaches rotational zero position, the radially extending shifter finger 48 engages the star-wheel 53, as illustrated in Fig. 11, and turns the wheel through a quarter revolution. On the other hand, if the latch approaches zero in tripped position as shown in Fig. 8, the finger 48 clears the star-wheel 53 so that the latter's position remains unchanged. However, as the latch 43 continues its travel to zero, the reset finger 49 engages a stationary detent 55 which by restraining the finger 49 throws the latch to normal or reset position, as shown in Fig. 7.

From the foregoing it will be evident that each revolution of the arm 42 starts with the latch 43 in reset position as shown in Fig. 7. It will also be evident that if the revolution is completed without the latch 43 having been tripped, the star-wheel 53 is shifted one-quarter turn, but if during the revolution the latch 43 is tripped, the star-wheel's position is unchanged.

The lower end of the star-wheel shaft 54 carries a double lobed cam 56 adapted to control the operation of a double-throw snap action switch 57, Figs. 1, 5 and 12, the connections and functions of which will be described hereafter in connection with the electrical diagram, Fig. 15. Due to the double-lobed structure of the cam 56 as noted, each quarter-turn of the star-wheel 53 reverses the contact position of the switch 57.

The star-wheel shaft 54 also carries a four-notched cam 58 adapted to actuate a single-throw switch 59, these parts being shown in diagrammatic plan in Fig. 15. By reference to the latter figure it will be seen that the switch 59 is normally open, but that each quarter-turn of the cam 58 causes the switch 59 to be closed in a momentary or passing contact.

A second star-wheel 60 is disposed on a second vertical shaft 61 in such position as to be operatively engaged by the reset finger 49 only when the latter extends radially outward in tripped position. The shaft 61 also carries a two-lobed cam 62 and a four-notched cam 63 adapted to operate a two throw snap action switch 64 and a single-throw normally open switch 65 respectively, in the same manner as previously described for the switches 57 and 59. The resistance of switches 64 and 65 to rotation is so small that when the finger 49 encounters the star-wheel 60 the latter yields one-quarter rotation without affecting the tripped position of the latch 43, the latter remaining unchanged until reset by engagement with the stationary detent 55 as previously described.

To summarize the foregoing, when the latch 43 approaches zero station in untripped position, the star-wheel 53 is operated, shifting the contacts of switch 57 and closing switch 59 momentarily, while the star-wheel 60 and its associated switches remain unaffected; if the latch 43 approaches zero station in tripped position, the star-wheel 60 and its associated switches are operated while star-wheel 53 and its switches are unaffected.

Two small grooved pins or detents 66 and 67 are axially slidable in the drums 26 and 27 near the latters' peripheries. Light springs 68 and 69, disposed under the inner end of forked rockers 70 and 71 which engage the pins 66 and 67, are adapted to move the latter inward into the rotary paths of the trip levers 46 and 47 respectively, as illustrated by the position of the pin 67 in drum 27, Fig. 1. However, in zero position of the drums, it is necessary that the pins be withdrawn from the paths of the levers 46 and 47. For this purpose, taking as typical the pin 66 and related parts, Figs. 1 and 5, an inwardly inclined forward extension 72 on the rocker 70 engages a stationary deflector 73 as the drum 26 moves into zero or stop position. The deflector 73 thereupon swings the rocker 70 against the spring 68, withdrawing the pin 66 as shown in Fig. 1. A second deflector 74 is provided to actuate the rocker 71 and pin 67 in the same manner.

The numeral 75, Figs. 1, 5 and 6, designates a second longitudinal shaft journalled in the casing 21 and adapted to be rotated by a second motor 76 via a worm 77 and gear 78. Two wheels 79 and 80 are mounted on the shaft in line with the outer portions of the peripheries of the follower drums 26 and 27 beyond the braking zones thereon. The wheels 79 and 80 are not rigidly secured to the shaft 75, but are retained thereon between resilient spiders 81 secured to hubs 82 fastened to the shaft, as shown in Fig. 6. The spiders 81 are adapted to rotate the wheels frictionally within a limited torque range, the spiders slipping on the wheel surfaces if the restraining torque increases beyond the limited range. The wheels 79 and 80 are equipped with resilient driving tires 83 for engagement with the drums 26 and 27.

Taking the drum 26 and its related restoring wheel 79 as typical of both combinations, it will be seen in Fig. 5 that the outer edge of the periphery of the drum in line with the wheel 79 has an elongated notch 84 which underlies the wheel 79, thus preventing engagement between the wheel and drum when the latter is in zero position as shown. In zero position a light stationary spring clip 85 is engaged by a pin 87 projecting from the end of the drum 26, thus serving normally to hold the drum accurately in this position.

When the device is in operation the restoring shaft 75 revolves continuously. If the drum 26 is in other than zero position the tire 83 is in engagement with the drum 26, thus urging the latter forward toward zero position. However, if the drum is engaged either by its clutch 28 or brake 37, slippage occurs between the wheel 79 and its frictional spiders 81, so that no alteration in the clutched speed or braked position of the drum 26 occurs. When the drum is released by both its clutch and brake, the friction drive of the wheel 79 becomes effective, immediately restoring the drum 26 at comparatively high speed to its normal zero position.

The same relationship as that described is maintained between the second drum 27 and its restoring wheel 80, the drum 27 likewise being provided with a zero holding pin 88 and a cooperative spring clip 89, Fig. 1. Thus when either drum is out of zero position and is released both by its clutch and brake, it is immediately restored to zero position.

An insulating ring 90, Fig. 1, mounted on the end of the casing 20, supports a circular resistor 91 engaged by a rotary sliding brush 92, the latter being secured to a conducting hub 93 which in turn is insulatedly fastened to the shaft 22. A stationary brush 94, provided with a terminal 95, furnishes an electrical connection to the hub 93 and rotary brush 92. The contact of the rotary brush 92 with the resistor 91 is of such circumferential extent as to span the gap 96 between the terminal end 97 of the resistor and the open end thereof when the device is in stop or zero position, as shown diagrammatically in Fig. 15.

A holding cam 98, Figs. 1 and 15, is secured to the left end of the shaft 22, being adapted to control a switch 99. The cam 98 is so notched that in normal or zero position, as shown in Fig. 15, the switch 99 is open, while at all other points in the rotation of the cam 98 the switch is closed.

Referring to Fig. 2, the numeral 100 designates a threaded bushing adapted to be screwed into a flange 101 secured on the shell of a boiler 102 or the like. Sealed in the bushing 100 is a tube 103 adapted to extend into the medium 102a within the boiler 102. The tube 103 is preferably formed of a suitable electrical insulating material such as porcelain or the like, having a moderate coefficient of heat transmission so that when an increase of temperature occurs on one side of the wall of the tube, a significant time-lag occurs before the similar rise is transmitted to the other side of the wall. Since within ordinary temperature ranges the coefficient of heat transfer of the tube material is substantially constant, it will be evident that when the rate of temperature change on one side of the wall is itself changing, changes in the actual temperature difference between the two sides of the wall over successive time intervals constitute a measure of the rate of the said increase or decrease in temperature change rate on the first side of the wall. For simplicity, the increase or decrease in rate of temperature change may hereinafter be referred to as thermal acceleration or thermal deceleration.

During the above described processes, while the wall of the tube 103 does not stop heat transmission, the necessity for heat to pass through it, in accordance with its coefficient of heat transmission, in order to transfer temperature changes or rates of temperature change from one side to the other, gives rise to the time lag noted. Accordingly, again for simplicity in further description, the wall of tube 103 may conveniently be referred to as a heat retarder.

Referring again to Fig. 2, a resistor 104 is coiled in the tube 103 in contact with the inner wall surface thereof, the inner terminal lead 104a being led out through an insulator 105. A second resistor 106, of substantially equal resistance, is wound on the outside of the tube 103, its lower terminal lead 107 also being conducted out through the insulator 105.

The outer resistor 106 may conveniently be made of wire including a thin coating of a suitable heat conducting protective material which allows it to be exposed directly to the medium in the boiler 102, or if the latter medium is corrosive or of electrolytic nature, a thin protective shell 108 of good heat conductive properties may be provided to closely surround the resistor 106.

The combination shown in Fig. 2, due to the face that it detects difference in rate of temperature change as hereinafter explained, may appropriately be referred to as a thermal acceleration detector unit.

Fig. 3 shows an alternative form of detector unit of flat construction adapted to be secured against a flat outer surface of a boiler-head 109 or the like. In this embodiment the resistors 110 and 111 are of flat construction and separated by a heat retarder plate 112, all housed in a casing 113. A heat insulating pad 114 of asbestos or the like is disposed between the outer wall of the casing and the resistor 110 to insulate the latter from the exterior temperature. It will be understood that the material of the retarder 112 is not limited to porcelain or the like, as any rigid or flexible material, or combination, may be used which is adapted to provide electrical insulation while having a moderate coefficient of heat transmission.

When a flexible material, or combination, is used for the heat retarding element, the detector unit may conveniently be formed as a band 115 adapted to be clamped about a boiler shell 116 or other cylindrical member such as a pipe containing a medium being heated, as illustrated in Fig. 4.

For clarity in explanation, the description of further elements and the operation of the invention will be carried out in connection with a steam boiler plant 117 provided with an oil burner 118, shown elementally in Fig. 14, but it will become evident to those skilled in the art that the invention is applicable to a wide variety of other types and purposes of heating apparatus.

In Fig. 14, the bushing 100 holding the detector unit described in connection with Fig. 2 is illustrated as screwed into the boiler 119 to immerse the unit in the fluid being heated.

Referring to Fig. 15, the numerals 120 and 121 designate a pair of conductors adapted to be connected to any suitable source of direct current. The conductor 120 is connected to one terminal of each of the resistors 104 and 106. The other terminals 122 and 123 of resistors 104 and 106 are respectively connected via a pair of matched parallel resistors 124 and 125 to the conductor 121. It will be seen that the above described combination comprises the main circuit arrangement of a Wheatstone bridge, any unbalance between the resistances of resistors 104 and 106 causing a difference of potential between the central terminals 123 and 122.

Terminals 122 and 123 are connected via wires 126 and 127 to two amplifiers 128 and 129. Both terminals are connected to both amplifiers to form input circuits therefor, but these circuits are polarized in opposite directions by means of small rectifiers 130 and 131 so that the amplifier 129 receives input current from the bridge circuit only when this current flows from terminal 122 to 123, while amplifier 128 receives input current only when this current flows from terminal 123 to 122.

The amplifiers 128 and 129 receive their power supply via wires 132 and 133 from a pair of main conductors 134 and 135 adapted to be connected to a standard source of available current.

Corresponding output conductors 136 and 137 of the amplifiers 128 and 129 have a common connection via a wire 138 to the stationary brush 94 engaging the rotary hub 93 of the circular resistor 91. From the terminal 97 of the resistor 91 a wire 139 makes a connection to the magnet 140 of a relay 141 and also via a branch 142 to the magnet 144 of a second relay 145. The second output conductor 143 of the amplifier 128 is connected to the magnet 140, while the second output conductor 146 of amplifier 129 is connected to the second relay magnet 144. The relays 141 and 145 are of the marginal type adapted to be actuated by a predetermined value of current. By the above described circuit connections, when the amplifier 128 is energized to the requisite output, the relay 141 is operated, and similarly, when the amplifier 129 is sufficiently energized the relay 145 is operated. When either relay is energized, subsequent rotation of the movable brush 92 in the circular resistor 91 progressively adds resistance to the circuit until the relay drops out, the amount of added resistance necessary to open the relay depending on the magnitude of the related amplifier's initial output current above that necessary to hold the relay closed. It is evident, therefore, that the angular position of the rotary brush 92 at the instant of drop-out establishes a mechanical measure of the above excess amplifier output. If, in two successive rotary cycles, the amplifier output increases, during the second cycle the brush 92 must move beyond the point at which drop-out occurred during the preceding cycle in order to open the relay.

The relay 141 has one normally open pole 148 connected on one side via a wire 149 with the supply conductor 134 and on the other side via a wire 150 with the main controller motor 23. The relay 145 has a similar normally open pole 151 also connected between the wire 149 and the wire 150 leading to the motor 23.

The second lead 152 of the motor 23 is connected to the supply conductor 135. Thus, closing either relay 141 or 145 starts the motor 23 to revolve the shaft 22. Thereupon the notched cam 98 closes the switch 99 to establish a second connection through the motor 23 between the supply conductors 134 and 135 via wires 153 and 152. This establishes a holding circuit for the motor 23 so that if the starting relay 141 or 145 opens during the revolution of the shaft 22 the motor continues to run until the revolution of the shaft is completed, at which point the cam 98 permits the switch 99 to re-open.

The relays 141 and 145 also have double throw switching members 154 and 155 respectively. Number 154 is connected to the supply line branch 149, while the normally closed contact of member 154 is connected via a wire 158 to the member 155, thereby also connecting the latter member to the supply branch 149 so long as the relay 141 is de-energized.

The normally open contacts 156 and 157 are both connected via wires 159, 160 and 161 to the magnet 162 of a ratchet relay 163, the magnet 162 also being connected via wires 164 and 165 to the supply line 135. From the above connections it will be seen that actuation of either relay 141 or 145 energizes the ratchet relay.

The armature 166 of the relay 163 is normally retracted by a spring 167, and carries a claw 168 adapted to engage a ratchet 169 so as to revolve the latter one tooth each time the magnet 162 is de-energized. The shaft 170 of the ratchet 169 has secured thereon a notched cam 171 controlling two double-throw switch arms 172 and 173. The number of notches in the cam 171 is one-half the number of teeth on the ratchet 169, so that each operation of the latter causes the cam 171 to switch the contact positions of both arms 172 and 173. The arm 172 is joined via a branch 174 to the previously described connections of the normally open relay contacts 156 and 157, so that the arm 172 can receive current only when either relay 141 or 145 is actuated. The arm 173 is connected by a wire 175 to the normally closed contact 176 of the double-throw contact member 155, and can, therefore, receive current only when both relays 141 and 145 are de-energized as shown.

In one position, as shown, the arm 172 closes a contact via a wire 177 to the clutch 28, while the arm 173 at the same time closes a connection via a wire 178 to the brake solenoid 40. Similarly, in the alternative position of the arms 172 and 173 connections are formed therefrom respectively via wires 179 and 180 to the clutch 34 and brake solenoid 39. Wires 181, 182, 183 and 184 complete the connections respectively of clutches 28, 34 and solenoids 40 and 39 to the supply line 135.

The numeral 186 designates a sensitive double-throw pressure switch controllable by the steam pressure in the boiler 119. Similarly, the numeral 187 generally denotes a fuel valve controllable by two notching magnets 188 and 189, operation of the magnet 188 serving to cut down the oil supply by steps, while magnet 189 similarly is operable to increase the supply.

In high pressure position, as shown, the pressure switch 186 closes a connection via wires 190 and 191 from the supply line 134 to the magnet 188, while in lower pressure position the switch 186 closes a similar connection via a wire 192 to the magnet 189.

A spring-pressed toggle member 193, adapted to be thrown from one position to the other alternately by the actuation of members 154 and 155 of the relays 141 and 145, is adapted to actuate a single-throw contactor 194 and a double-throw contactor 195. In normal position as shown, the single-throw contactor completes a connection via wires 196 and 197 from the fuel control magnet 188 to a normally open stationary contact point 198 of the cam switch 65. A second normally open stationary contact point 199 of switch 65 is connected to the supply line 135. Thus when the switch 65 is closed with the toggle contact 194 and pressure switch 186 in the positions shown in Fig. 15, a circuit is established from the line 134 to line 135 through the fuel control magnet 188.

A wire 200 forms a connection to the movable electrodes of both cam switches 59 and 65, and the single normally open stationary contact point of the switch 59 is also connected to the supply conductor 135. It will be evident from these connections that if the pressure switch 186 is thrown to its lower position in Fig. 15, closure of either cam switch 59 or 65 causes energization of the magnet 189.

In its normal position as shown, the double-throw toggle switch 195 holds a connection from the supply conductor 135 via wires 165, 201 and 202 to the common pole of the double-throw switch 57. The latter switch is adapted to continue the above connection either to a conductor 203 or to a second parallel conductor 204, depending on the position of the two-lobed cam 56. When the toggle switch 195 is thrown to its other position by action of the relay 145, a connection similar to the above is made through a wire 205 to the second double-throw switch 64, thence to either the conductor 203 or the conductor 204, dependent on the position of the two-lobed cam 62.

The conductor 203 is connected to a normally closed limit switch 206, thence normally through a wire 207 to one directional winding of a reversible gear-motor 208. Similarly, the conductor 204 is connected to a second normally closed limit switch 209, thence via a wire 210 to the second directional winding of the motor 208. The third motor lead 208a is connected to the supply conductor 134.

The reversible motor 208 is adapted to control a damper 211 in the stack 212 of the steam plant 117, Fig. 14. The shaft 213 of the damper 211 has on its end an arm 214 adapted to engage the limit switch 206 when the damper 211 reaches its position of maximum closure. The switch 206 is of the well-known "make-before-break" type which when actuated diverts the connection of the conductor 203 from the reversible motor 208 to a wire 215 leading to a second reversible gear-motor 216. Similarly, at the point of maximum damper opening the arm 214 engages the second limit switch 209, throwing the electrical connection of the conductor 204 from the motor 208 through a wire 217 to the motor 216.

The second reversible motor 216 is adapted to adjust a speed control rheostat 218 in the circuit of a blower motor 219 on the burner 118, Fig. 14.

By the above described circuit connections, if the relay 141 is actuated, the damper motor 208 is normally reversed each time the star-wheel shaft 54 is rotated one-quarter revolution; that is, each time the latch 43, Figs. 1, 7 and 8, approaches zero in normal or re-set position, as previously described. Similarly, if the relay 145 is actuated, the blower motor 208 is normally reversed each time the second star-wheel shaft 61 receives a quarter turn, that is, each time the latch 43 approaches zero in tripped position. If at any time the damper 211 reaches maximum closure position the limit switch 206 stops the damper motor 208 and starts the blower control motor 216 which shifts the rheostat 218 to slow down the blower motor 219. If, on the other hand, the damper 211 reaches full open position the limit switch 209 also stops the damper motor 208 and causes the blower control motor 216 to speed up the blower motor 219 by shifting the rheostat 218.

Similarly, it will be evident that after an actuation of the relay 141 which throws the toggle 193 to the position shown in Fig. 15, each quarter-turn of the second star-wheel shaft 61 momentarily energizes the notching solenoid 188 to cut down the fuel feed, provided the pressure switch 186 is in actuated position as shown. If the load or pressure switch 186 is in lower or sub-normal position, the solenoid 188 is disabled by opening its connection to the supply conductor 134, preventing any reduction in fuel feed.

On the other hand, if the load switch 186 is in actuated position as shown, the notching magnet 189 is disabled, so that no increase in oil feed can be made. However, if the load switch is not actuated, restoring the connection from supply conductor 134 to the magnet 189, each quarter-turn of either star-wheel shaft 54 or 61 causes the magnet 189 to be energized, thereby increasing the fuel feed.

The general operation of the device is as follows, referring to Fig. 15.

Assuming the outer resistor 106 to be in direct thermal communication with the medium being heated, a rise in the latter's temperature affects the resistor 106 at once, while the temperature rise reaches the inner resistor 104 only after a time lag due to the interposition of the retarder 103 as previously set forth. Consequently, the temperature and hence the resistance of the outer resistor 106 becomes greater than that of the inner resistor 104, unbalancing the Wheatstone bridge circuit and causing an input current to flow through the amplifier 128.

The output current from the amplifier 128, if of sufficient magnitude, energizes the relay 141. The follower drum 27 is assumed to be held by its brake shoe 38 in a position other than zero, this position having been determined in a prior rotation of the shaft 22. Actuation of the relay 141 causes the clutch 28 to engage and starts the control motor 23 to revolve the shaft 22. At the same time the ratchet relay 163 is energized.

As the shaft 22 revolves it carries with it the arm 42, the rotary brush 92 and the clutched follower drum 26, the direction of rotation being clock-wise in the diagrammatic and detail figures. As the rotary brush 92 sweeps around the resistor 91, it progressively increases the resistance in the previously described circuit of the relay magnet 140 until the current therein becomes insufficient to keep the relay 141 actuated. At this point the relay 141 drops out, de-energizing the clutch 28 and allowing the ratchet relay 163 to shift the contact position of switch arms 172 and 173. The shift of the arm 173 energizes the solenoid 39, causing the latter to shift the brake rocker 35, thereby releasing the drum 27 and applying the shoe 37 to the drum 26 to stop and hold the latter.

The drum 27 having been released by the shoe 39, and its clutch 34 not being energized due to the open contact 156 of the relay 141, the restoring wheel 80, Fig. 1, immediately restores the drum 27 to zero position as previously described. Meanwhile, due to the operation of the holding cam 98 and switch 99, the motor 23 continues to run until it returns the arm 42 and rotary brush 92 to zero position, leaving the follower drum 26 locked in the position it occupied when the relay 141 opened.

As the brush 92 reaches zero position it removes the resistance of the circular resistor 91 from the magnet circuit of the relay 141. If the rate of temperature rise of the heated medium is still sufficient to maintain the requisite unbalance of the Wheatstone bridge circuit, the relay 141 again is actuated. Thereupon the above described cycle is repeated, except that in this case it is the second follower drum 27 which is clutched and rotated forward in the manner described. When movement of the brush 92 on the resistor 91 has been sufficient to drop out the relay 141, the clutch 34 is released and the position of the brakes 38 and 37 is again reversed, stopping the drum 27 and allowing the drum 26 to be returned to zero position by its restoring wheel 79.

From the foregoing, it will be evident that so long as the temperature of the heated medium continues to increase at a rate sufficient to maintain the requisite unbalance of the Wheatstone bridge circuits, the controller 20 continues to go through successive cycles, alternately releasing each follower drum and locking the succeeding one in a rotary position dependent on the magnitude of the bridge unbalance, and hence on the rate of temperature change. If the rate of temperature rise increases from one cycle to the next, the moving drum and the accompanying arm 42 move past the locked position of the previously locked drum before the latter is released, since the greater additional bridge unbalance requires a greater addition of resistance by the brush 92 to effectively kill the holding circuit of the relay 141. On the other hand, if the rate of temperature rise decreases, the bridge unbalance also decreases so that less added resistance is necessary to kill the holding circuit. Consequently, the motion of the following drum is stopped short of the position of the previously locked drum.

When either drum leaves zero position accompanied by the arm 42, its trip pin 66 or 67 is pressed lightly by its spring against the side of the corresponding trip lever 46 or 47, so that the latter's action is not affected by this pin. However, the trip pin of the previously stopped drum projects into the circular path of the corresponding lever, as illustrated by the pin 67 in Fig. 1. Consequently, if in any cycle the latch 43 overrides the position of the trip pin of a locked drum, the pin trips the latch. If, however, the previously locked drum is released before the latch 43 reaches its trip pin, the latch remains in normal or re-set position throughout the remainder of the cycle.

The foregoing relationships are illustrated diagrammatically in Figs. 9 and 10, each of which shows the relationship at the moment one drum is released and the other stopped. In Fig. 9, due to the decrease in rate of temperature change during the preceding cycle, the previously stopped pin 67 is released and is starting its restoring motion, while the pin 66 is being stopped. Consequently the latch 43 does not engage the pin 67, with the result that the latch is not tripped and at the end of the cycle the finger 48 actuates the star-wheel 53 as previously described. In Fig. 10, due to an increase or acceleration in rate of temperature change, the latch 43 has overridden the previously stopped pin 67 before the latter is released, so that the latch 43 is tripped. Under this condition the star-wheel 53 is cleared by the shifter finger at the end of the cycle and consequently is not shifted. However, under this same condition the re-set finger 49 engages the second star-wheel 60 to revolve it one-quarter turn as previously described.

From the foregoing description it will be seen that increases or decreases in the rate of temperature change in the heated medium cause the setting up of electro-mechanical relationships which control the elements of combustion, since both the damper or air and the fuel supply regulating devices are controlled by the operation or non-operation of the star-wheels and their related switches.

The above description has been carried out with respect to the operation during a rise in temperature of the heated medium. In the case that the medium's temperature is falling as a result of increased load or the like, the unbalance of the Wheatstone bridge circuit is reversed, since the drop in temperature of the inner detector resistor 104 lags behind that of the outer resistor 106 due to the heat retarder 103, causing the resistance of 106 to assume a lower value. This unbalance causes input current to flow through the amplifier 129, and the latter's output current energizes the second control relay 145. The latter, by previously described connections, initiates the same mechanical interaction of the controller parts as that described for rising temperature. However, due to the shifting of the toggle switch 195 by the relay 145, control of the damper motor 208 is transferred from the switch 57 to the similar switch 64. Therefore, while during rising temperature a decrease in rate of temperature change causes a change in direction of the damper control, with falling temperature such change in direction of damper movement is affected by an increase or acceleration in rate of temperature change.

The general regulating operation of the device under various conditions may best be summarized by the following table. In this table the switch 186 is generally termed the load switch, for while it has been described for example as a pressure switch, it obviously may be of a sensitive thermostatic type. By the expression "on," the load switch is designated as in the position shown in Fig. 15, wherein the load is being satisfactorily met, while by "off" is meant the position of the switch when an increase in steam rate is required. Also, since both the stack damper motor 208 and the blower regulator motor 216 affects the rate of air supply, the operation of these units, as previously described, is referred to simply as "air regulator movement."

| Load Switch | Temperature | Change Rate | Air Regulator Movement | Fuel Rate |
|---|---|---|---|---|
| On | Rising | Accel | No change | Cut down. |
| Do | do | Decel | Reverse | No change. |
| Do | Falling | Accel | do | Do. |
| Do | do | Decel | No change | Do. |
| Off | Rising | Accel | do | Increase. |
| Do | do | Decel | Reverse | Do. |
| Do | Falling | Accel | do | Do. |
| Do | do | Decel | No change | Do. |

It is well known to those skilled in the art that a Wheatstone bridge combination is adapted to detect very small changes in resistance. It will, therefore, be understood that by the use of a high gain ratio in the amplifiers 128 and 129, the controlling functions of the invention as described may normally be carried out in response to variations in rate of temperature change so small as to be almost in the category of tendencies rather than measurable changes. In any heating system absolute uniformity of temperature in the medium being heated is not normally attainable, tendencies toward temperature changes either large or small being a constant occurrence due to various factors such as changes in load, wind changes affecting chimney draft, etc. It is the function of the present invention to detect such changes as they start, to analyze them as to whether the changes are tending to progressively increase or decrease, and accordingly to control the combustion processes in such manner as to restore the properly uniform temperature condition with maximum speed and efficiency of combustion. In other words, undesirable temperature changes are "nipped in the bud" and remedial measures applied at once, these measures being not based on a set control procedure such as invariable increase of fuel and air supply with temperature fall, and a decrease in these components with temperature rise. In the present invention the remedial measures are based rather on a selective joint control of the factors of combustion in variable combination based on the requirements as set up by the load conditions, direction of temperature change, and tendency toward increase or decrease in the rate of temperature change.

The above stated principle of the device is based on the fact that the causes of temperature change rates are not tied to any one combustion supply element in invariable relation. For example, a temperature drop in a heated medium may be caused by insufficient draft or air supply rate, or it may also be caused by too great a draft or too much excess air which unduly cools the fire or produces excess stack losses. With the present device it will be noted that when the detector picks up an undesirable variation in the rate of temperature change, indicating that the air regulation by the motor 208 is proceeding in the wrong direction, reversal of the direction of air regulation takes place to remedy the condition, regardless of whether the air supply is being increased or decreased at the time the undesirable change is detected.

For example, suppose the motor 208 to be gradually moving the damper 211 in an opening direction while the temperature of the heated medium is rising. If the resistors 106 and 104 detect a decrease in the rate of temperature rise, indicative of a tendency to excess air feed, the latch 43 does not overtake the previously braked trip pin, with the result that the motor 208 is reversed at the end of the cycle to cut down the rate of air supply. On the other hand, if when the deceleration in temperature change is detected the air supply is being cut down, the deceleration may be indicative of tendency to too little air, and the subsequent reversal of the motor 208 increases the air supply. When the reversed condition stops the loss in rate of temperature rise, the latch 43 overtakes a previously braked trip pin so that the favorable direction of damper movement is continued into the next cycle and so long as the rate of temperature rise continues to accelerate.

It is obvious that an accelerating rate of temperature rise is normally desirable, being indicative of efficient combustion and transfer of heat to the medium in the boiler. Therefore, when at any time such as after a heavy sudden steam demand, or during initial heating up of the boiler, the load switch is in lower or "off" position, the acceleration in temperature rise is accompanied by an increase in fuel supply by the valve 187 in order to bring the system up to full load output as rapidly as possible. When the load is being satisfactorily met and the load switch 186 is thrown to "on" position, Fig. 15, an undue further acceleration in temperature rise is unwarranted as using unnecessary fuel. Under these conditions the switch 65 energizes the fuel control magnet 188 to cut down the fuel rate in the manner previously described.

While, as noted, an increase in rate of temperature rise is generally desirable, an increase in rate of temperature drop is obviously undesirable. Therefore, by the operation of relay 145 instead of relay 141, in the manner previously set forth, an acceleration of temperature drop causes a change in direction of damper movement, while deceleration in temperature drop, indicating a checking of the cooling process, calls for no change. If the load is not being met, as each cycle of the arm 42 and latch 43 actuates one or the other of the star-wheels 53 and 60, the fuel control magnet 189 is energized via switch 59 or 65 to increase the fuel supply. If the load is being met, however, no cut-down in fuel supply is made during increase in temperature drop, since the shifting of the toggle switch 195 by the relay 144 disables the circuit of the control magnet 188.

Under conditions of steady temperature rise or fall, the follower drums alternately assume substantially the same rotative positions, the latch 43 being tripped or untripped on each rotation in accordance with whether either drum stops slightly behind or slightly overruns the preceding drum. As the temperature change gradually subsides, that is as completely stable load condition is approached, the extent of travel of the drums on succeeding cycles becomes less and less. If the deceleration is in rate of temperature rise, the clamper 211 oscillates back and forth through a nearly constant range during succeeding cycles. If the deceleration is in rate of temperature drop the damper continues its constant motion in one direction to hasten the deceleration.

In either case, when substantially stable temperature is reached in the heated fluid, the resistors 104 and 106 acquire practically the same temperature and consequent resistance. Thereby the Wheatstone bridge circuit is sufficiently balanced that neither relay 141 nor 145 is energized, so that the motor 23 is not re-energized at the end of a cycle. The controller parts, therefore, remain stationary, with the damper 211 slowly moving in one direction until the first small increment of temperature change in the heated medium due to load change or other factors again unbalances the bridge.

The damper 211 is so proportioned that its action controls only a fractional portion of the air rate, preferably in the order of 20 per cent. The main rate of air flow is determined by the speed of the blower motor 219. Thus the damper's action is that of constant hunting control of the upper 20 per cent. Under normal conditions of reasonably constant load, due to the highly sensitive controlling of the device by the Wheatstone bridge and amplifiers 128 and 129 as described, ample control range is provided within the upper fraction of the air rate by the damper alone. During major changes in load or when for any other reason the damper reaches its maximum closed or open position while still greater change in air supply is required, the motor 216 takes over by action of limit switch 206 or 209, to affect the necessary extra change by speeding up or slowing the blower motor 219.

Since, as previously set forth, the unbalance of the Wheatstone bridge and consequent control depend not on any particular temperature value per se, but rather on variations in the rate of temperature change, the apparatus is operable to automatically adjust the various combustion control devices to the proper operating conditions in any temperature zone, eliminating the necessity for individual setting or adjustment of these elements. To provide for proper plant operation at any desired steam or other fluid pressure or temperature, it is only necessary, therefore, to set the load switch 186 at the desired point.

A typical cycling speed of the controller shaft 22 is about one revolution in ten seconds, and the gear reductions of the reversing motors 208 and 216 are sufficiently large to prevent violent fluctuations in combusion during changes in regulation. However, it is obvious the apparatus may be constructed for any desired combination of cycle speed and sensitivity of combustion regulation, in accordance with the requirements of different types of heating installations and services.

It will be understood that while the element 211 has been described as a stack damper for purposes of example, it may be any type of well known device for controlling a portion of the air supply, such as a similar valve in the blower system. Similarly, the blower may be of the induced draft type, and the fuel supply means an automatic stoker obviously controllable by the control unit 20 and the related relay switches in the manner described.

As an alternative arrangement of detector, a unit may be constructed as shown in Fig. 2 but with a third resistor within the interior of the resistor 104 and separated therefrom by a second heat retarder. In this case the bridge circuit is of the double type, the unbalance between the first and second legs controlling one phase of operation, with the other phase controlled by the unbalance between the second and third legs.

While the device has been described in preferred form, it is not limited to the exact structures illustrated, as various changes and modifications may be made without departing from the scope of the appended claims.

What is claimed is:

1. In a control system for a heating plant, in combination, a rotary shaft, means to rotate said shaft in successive unidirectional cycles, an arm on said shaft, a latch pivotally secured on said arm, said latch having a normal and a tripped position relative to said arm, a pair of follower members rotatably mounted on said shaft adjacent said arm, means to alternately clutch said follower members to said shaft at the beginning of successive cycles, braking means operable to alternately stop said members, means to control said clutching and braking means to declutch and stop the previously clutched member during each cycle while releasing the member stopped during the preceding cycle, means to restore said released member to normal position, a trip detent on each of said follower members adapted to trip said latch when said latch overrides the detent on a previously stopped follower member, two switching means selectively operable by said latch when said latch approaches the end of each of said successive cycles in tripped or normal position, means to restore said latch from tripped to untripped position at the end of any cycle, and means responsive to magnitudes of an electric current during said successive cycles to determine the angular stopped positions of said follower members during said cycles.

2. The combination claimed in claim 1 wherein said clutching and braking control means includes a relay operable by said current and adapted to release at a pre-determined value of said current, and a variable resistor operable by said shaft to progressively increase the resistance in the operating circuit of said relay whereby said current may be decreased to said release value during any of said cycles.

3. The combination claimed in claim 1 wherein said clutching and braking control means includes a relay operable by said current and adapted to release at a pre-determined value of said current and a variable resistor operable by said shaft to progressively increase the resistance in the operating circuit of said relay during each of said cycles, and including electrical means responsive to the rate of temperature change in a medium heated by said plant to initiate and maintain said current, said response of said electrical means and said current being variable in accordance with variations in said rate of temperature change.

4. The combination claimed in claim 1 including individual means to regulate the air and fuel supply for combustion in said plant, the direction of adjustment of said air regulator being controllable by each of said selectively operable switching means, and further including a load-switch responsive to the quantitative demand on said plant, said fuel regulator being controllable jointly by said selectively operable switching means and said load-switch.

ASSIR M. LEVINE.

REFERENCES CITED

The following references are of record in the file of this patent:

UNITED STATES PATENTS

| Number | Name | Date |
|---|---|---|
| 1,643,582 | Martin | Sept. 27, 1927 |
| 1,650,887 | De Florez | Nov. 29, 1927 |
| 1,819,124 | Rockwood | Aug. 18, 1931 |
| 1,916,477 | Hodgson et al. | July 4, 1933 |
| 1,931,474 | Ryder | Oct. 17, 1933 |
| 1,946,155 | Foster | Feb. 6, 1934 |
| 2,261,343 | De Florez et al. | Nov. 4, 1941 |
| 2,266,185 | Fillo | Dec. 16, 1941 |